July 13, 1937.    J. A. H. CASTONGAY    2,087,100
CONSTRUCTION OF AN EMERGENCY TIRE CHAIN
Filed Sept. 24, 1935
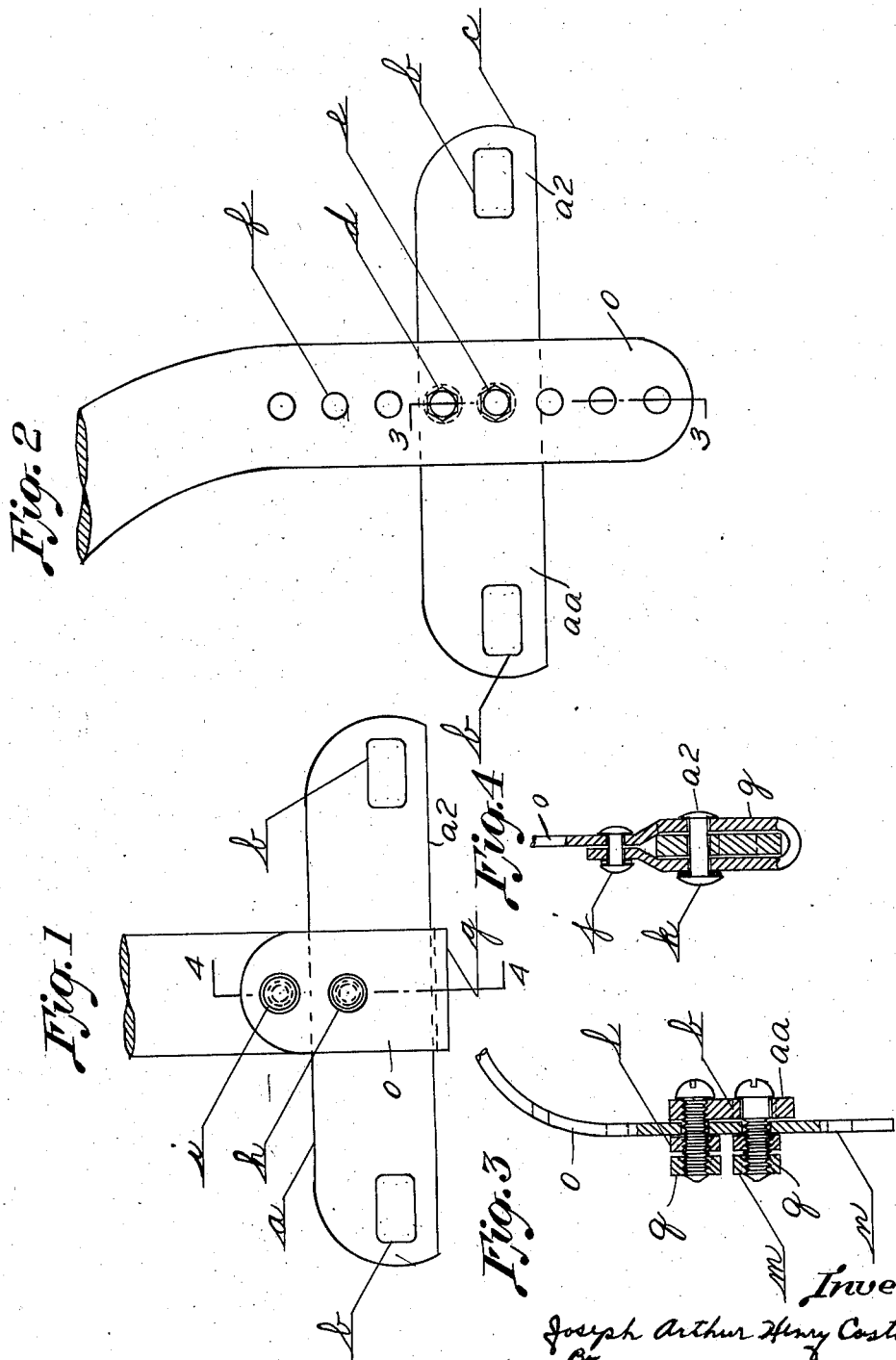

Patented July 13, 1937

2,087,100

UNITED STATES PATENT OFFICE 2,087,100

CONSTRUCTION OF AN EMERGENCY TIRE CHAIN

Joseph Arthur Henry Castongay, Woonsocket, R. I.

Application September 24, 1935, Serial No. 41,856

1 Claim. (Cl. 152—14)

This invention relates to anti-skid devices for automobiles, and more particularly to what are termed emergency tire chains for quick and convenient application to the tire, if needed, and has advantages and novel features hereafter pointed out.

In the drawing of one embodiment of my invention, disclosed and described herein:—

Fig. 1 is a plan of one of the chain plates, showing one end of the locking strap, partly broken away, and the chain being omitted for convenience.

Fig. 2 is a similar view of the opposite chain plate, with end of the strap locked thereto;

Fig. 3, a vertical section through the strap end on the line 3—3 of Fig. 2; and

Fig. 4, a similar view through the opposite strap end, Fig. 1, on the line 4—4.

My novel emergency tire chain unit is designed for quick, convenient and secure application to, and convenient removal from, a tire, and comprises a plurality of chain or frame plates $a$, $aa$, of suitable material, as metal, connected by a plurality of chains, as two, not shown, with the straight edges $a2$ of the plates opposite to each other, and separated at such distance as will permit one plate to rest against approximately the center of the tire on each side circumferentially thereof, while permitting the use of the chains on tires of different sizes within certain limits.

The plates $a$, $aa$, are provided with rectangular perforations $b$ near each end, to receive the end link of the chain in each case.

In order to provide secure non-slip locking means for locking the plates and chains adjustably and reversibly to the wheel rim and tire, while permitting reasonable adjustment to fit different size tires, the plates $a$, $aa$, Fig. 2, are connected by a flexible strap $o$, perforated as at $f$, of suitable material, as soft iron or canvas.

The strap $o$ is perforated at one end, as at $h$, $i$, Fig. 1, and carried about the outer edge $a2$ of the plate $a$, as at $g$, to receive the rivets $k$ and $j$, Fig. 4, to positively and integrally lock the plate to the strap end.

The strap is also perforated at $d$, Fig. 2, to receive the screw $l$, Fig. 3, threaded throughout, or not threaded, as at $e$, Fig. 2, to receive the screw $m$ partly threaded, with locking nuts $q$ therefor, which screws lock the free strap end to the plate $aa$ in permanent and non-slip relation, and whereby the strap and plate also become integrally united as one element. This construction also acts to maintain a substantially right-angle relation between the strap ends and the plates $a$, and thereby distributes more equally between the chains on one plate the anti-skidding function, than is possible where end plates are used that are free to swing on the strap ends, and become displaced circumferentially on the tire, and at varying distances from each other.

This construction also acts to prevent the pivotal movement of the plates and chains on the strap ends, which movement allows the chains at times to swing in a greater arc about the tire, and thereby permits them to strike the mudguards with objectionable noise and injury to the guards, and also allows the chains by such swinging to turn almost, if not completely, over relative to the plates, and to position themselves upright between the tire and road, and frequently cut the tire. This danger increases after the chains have become worn, and the links sharper on their edges.

When the chains have become partly worn on one side, the screws $l$ or $m$ may be removed, the chains reversed as to position on the tire, a new face thereby presented to the road surface, and then the screws reinserted and locked, and the chains again used, until the opposite chain face has become worn.

Reversing the chains adds nearly 50% to their life, with the added efficiency of chains not worn, over those that are badly worn.

Emergency chains are now made with buckles, or other devices for locking the chains to the tire and wheel rim, but these devices are often difficult to manipulate, and they frequently become loosened and unfastened when driving at fast speed.

Emergency chains of this type as now constructed can not be reversed without detaching the chains from the plates, because the buckle, whether with a tongue or other locking means, will not safely operate when reversed, and the chain fastened on the wheel.

My novel emergency chains are readily applied in any kind of weather, or driving conditions, and as readily removed.

I claim:

An emergency tire chain unit comprising a strap to engage the wheel rim between the spokes, a plurality of plates connected by cross chains, the plates adjustably and reversibly secured to the strap ends in non-slip relation with stud-like elements, and thereby held at a predetermined angle to the strap ends and thus preventing pivotal movement of the plates thereon, and swinging of the chains in a greater arc on the strap ends with consequent striking of the chains against the mud-guard and turning of the chains to edgewise positions between the road and tire to cut the tire.

JOSEPH ARTHUR HENRY CASTONGAY.